(12) United States Patent
Kinoshita et al.

(10) Patent No.: US 6,460,503 B2
(45) Date of Patent: Oct. 8, 2002

(54) OIL PUMP LAYOUT STRUCTURE FOR INTERNAL COMBUSTION ENGINE

(75) Inventors: Yuji Kinoshita; Tomotaka Takano; Yukihiro Kitagawa, all of Iwata (JP)

(73) Assignee: Yamaha Hatsudoki Kabushiki Kaisha, Iwata (JP)

(*) Notice: Subject to any disclaimer, the term of this patent is extended or adjusted under 35 U.S.C. 154(b) by 0 days.

(21) Appl. No.: 09/681,373

(22) Filed: Mar. 26, 2001

(65) Prior Publication Data

US 2002/0007811 A1 Jan. 24, 2002

(30) Foreign Application Priority Data

Apr. 18, 2000 (JP) .......................................... 2000-116910

(51) Int. Cl.7 ................................................. F01M 1/02
(52) U.S. Cl. .................................................. 123/196 R
(58) Field of Search ........................ 123/196 R, 195 C, 123/198 C; 184/6.28

(56) References Cited

U.S. PATENT DOCUMENTS

| 4,295,807 A | 10/1981 | Kruger |
| 4,827,881 A | 5/1989 | Baker et al. |
| 4,977,870 A | * 12/1990 | Hashimoto et al. ..... 123/196 R |
| 5,279,265 A | * 1/1994 | Matsuo et al. .......... 123/195 C |
| 5,314,319 A | 5/1994 | Nilsson et al. |
| 5,395,217 A | 3/1995 | Hoffman et al. |

FOREIGN PATENT DOCUMENTS

| DE | 1576345 | | 2/1970 |
| DE | 4219538 | | 1/1993 |
| GB | 2329675 A | * | 3/1999 |
| JP | 6211303 | * | 3/1987 |
| JP | 62-168908 | | 7/1987 |

OTHER PUBLICATIONS

European Search Report dated Sep. 10, 2001.

* cited by examiner

Primary Examiner—Marguerite McMahon
Assistant Examiner—Hyder Ali
(74) Attorney, Agent, or Firm—Ernest A. Beutler

(57) ABSTRACT

An improved oil pump drive arrangement and pressure relief valve therefore for an internal combustion engine. The oil pump is disposed externally of the engine around a shaft that extends through the body of the engine. This extending portion of the shaft drives at least one engine accessory through a pulley which axially overlaps and circumferentially surrounds the oil pump housing to provide a compact engine construction.

12 Claims, 6 Drawing Sheets

OIL PUMP LAYOUT STRUCTURE FOR INTERNAL COMBUSTION ENGINE

BACKGROUND OF INVENTION

This invention relates to an internal combustion engine and more particularly to an improved, compact and low cost oil pump arrangement for such engines.

Generally four-cycle internal combustion engines are lubricated by an oil pump that is generally positioned within the body of the engine and which is generally driven off of the crankshaft at one end thereof. Such constructions have some disadvantages, particularly when considering that it is also a conventional practice to embody the pressure relief system for the oil pump within the oil pump body. By positioning this part of the engine within the engine body, it tends to elongate the engine, particularly when the accommodation for the relief valve is considered.

With the modern space constraints placed upon internal combustion engines, particularly those for automotive applications, such increases in engine length are unacceptable or undesirable.

It is, therefore, a principal object to this invention to provide an improved, compact and simplified oil pump for an internal combustion engine.

It is a further object to this invention to provide an improved oil pump and relief arrangement for an engine that permits the engine to be compactly constructed.

SUMMARY OF INVENTION

This invention is adapted to be embodied in an internal combustion engine that comprises an engine body, which defines at least one combustion chamber in which a piston reciprocates. A shaft is driven by the reciprocation of the piston. The shaft has an end portion that extends beyond an outer wall of the engine body. A pulley is affixed to the shaft end portion for driving an engine accessory. An oil pump housing is affixed to the outer wall in surrounding relationship to the shaft end portion and containing a pumping element driven by the shaft end portion for pumping a lubricant for the engine.

DETAILED DESCRIPTION

Figure 1:
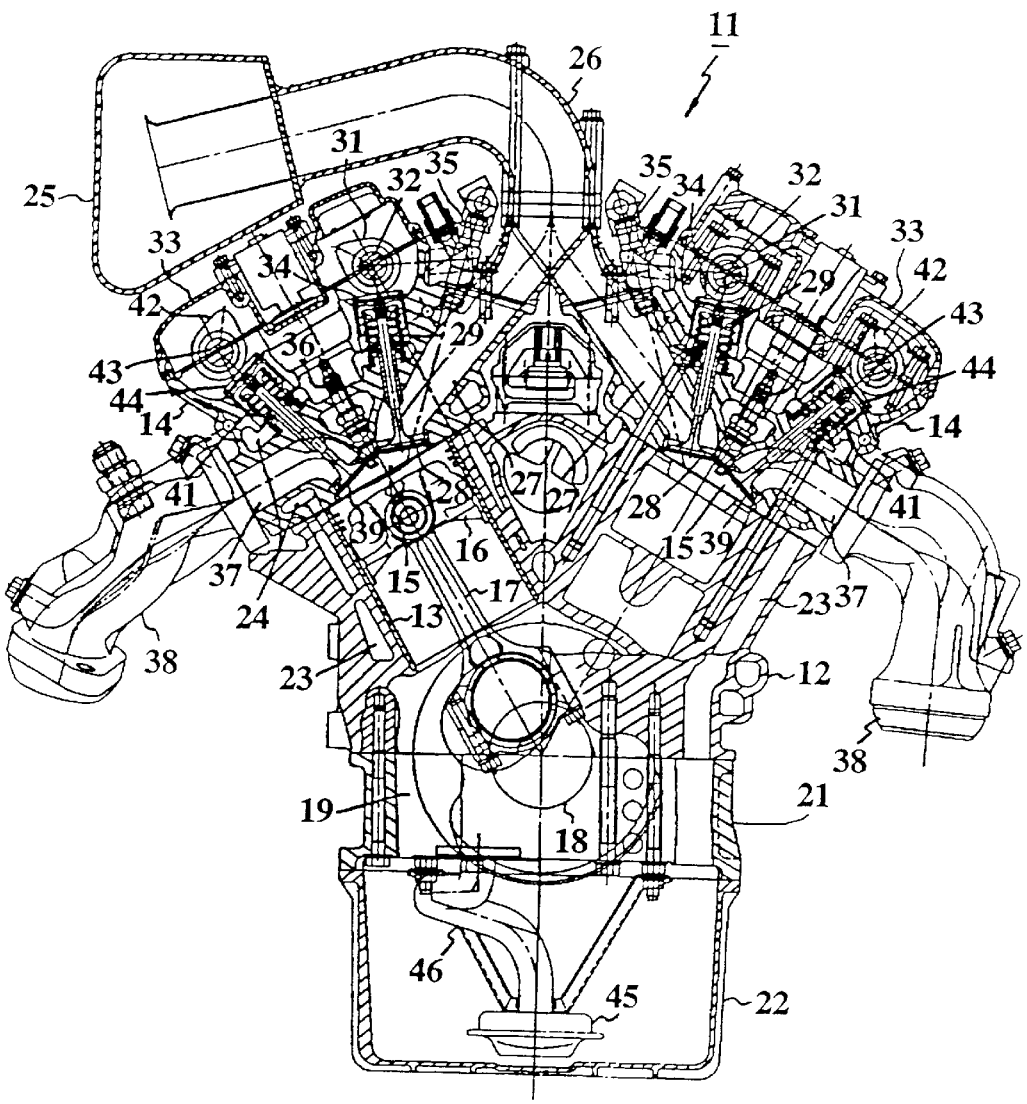
FIG. 1 is a cross sectional view of an engine constructed in accordance with an embodiment of the invention taken along a transverse plane to the crankshaft axis.

Referring now in detail to the drawings and initially primarily to FIG. 1, an internal combustion engine constructed in accordance with an embodiment of the invention is indicated generally by the reference numeral 11. Although the invention deals primarily with the construction and operation of its oil pump, which is shown in more detail in the remaining figures, the overall construction of the engine 11 will be described generally so as to permit those skilled in the art to understand an environment in which the invention can be practiced. Of course, the description of the basic engine components is for illustration only and those skilled in the art will readily understand how the invention can be utilized with a wide variety of types of engine constructions and engine configurations.

The engine 11, in the illustrated embodiment, is of the V-type and accordingly is embodied in an engine having a cylinder block 12 having a pair of angularly related cylinder banks in which cylinder bores 1 3 are formed. In the specific embodiment illustrated, the engine 11 is of the V8 type and there are four cylinder bores 13 in each cylinder bank.

One end of each cylinder bank and specifically the cylinder bores 13 formed therein is closed by a respective cylinder head assembly 14. These cylinder head assemblies 14 have recesses 15 formed in their lower surfaces that cooperate with the cylinder bores 13 and pistons 16 reciprocating therein to form the combustion chambers of the engine.

The pistons 16 are connected by piston pins to the upper or small ends of respective connecting rods 17. The connecting rods 17 are, in turn, journalled on the throws of a crankshaft 18.

The crankshaft 18 is rotatably journalled in a crankcase assembly 19 which is comprised of the skirt of the cylinder block 12, an oil pan and bearing forming member 21 and an oil pan 22 that is affixed to the underside thereof and which defines an oil reservoir in which lubricant for the engine is contained.

The engine 11 is preferably, but not necessarily, liquid cooled and to this end, the cylinder block 12 is provided with a cooling jacket 23 and the cylinder head assemblies 14 are provided with cooling jackets 24. Coolant is circulated through these cooling jackets 23 and 24 by a coolant pump of a known type in any suitable manner.

An induction system is provided for supplying at least an air charge to the combustion chambers of the engine. This induction system includes a plenum chamber device 25 which is disposed above one of the cylinder banks and specifically the cylinder head assembly 14 thereof and which has a suitable atmospheric air inlet. This atmospheric air inlet may include a filtering and silencing device as well as a throttle body for controlling engine speed.

The plenum chamber device 25 serves an intake manifold, indicated generally by the reference numeral 26, that has discharge ends which communicate with intake passages 27 formed in the valley side of the cylinder head assemblies 14. These intake passages 27 are valved by intake valves 28 that are slidably mounted in the cylinder head assemblies 14. These intake valves 28 are urged to their closed position by means of coil compression spring assemblies 29. The intake valves 28 are opened by the lobes 31 of respective intake camshafts 32 that are journalled in the cylinder head assembly 14 in an appropriate manner. These camshafts 32 are covered by cam covers 33 that are affixed to the respective cylinder heads.

The cam lobes 31 cooperate with thimble tappets 34 that are interposed between the cam lobes 31 and the stems of the intake valves 28 in a manner well known in this art. The intake camshafts 32 are driven at one half the rotational speed of the crankshaft 18 by any suitable cam shaft driving arrangement.

Fuel injectors 35 are mounted in the cylinder head assemblies 14 for injecting fuel into the intake passages 27 for delivery to the engine combustion chambers. The admitted fuel charge is ignited by means of spark plugs 36 that are mounted centrally in the engine combustion chambers by the cylinder head assemblies 14.

The charge which is admitted to the combustion chambers and ignited by the spark plugs 36 will expand and then be discharged through exhaust passages 37 formed in the cylinder head assemblies 14 on the sides away from the valley and opposite to the intake passages 27. These exhaust passages 37 communicate with exhaust manifolds 38 fixed to the outer surface of the cylinder head assemblies 14. These exhaust manifolds 38 communicate with any suitable type of exhaust system.

The flow through the exhaust passages 37 is controlled by exhaust valves 39 that are mounted in the cylinder head assemblies 14 and which like the intake valves 28 are urged to their closed position by coil spring assemblies 41. The exhaust valves 39 are opened by means of lobes 42 of exhaust camshafts 43 that are also journalled by the cylinder head assemblies 14 and enclosed within the cam chambers defined by the valve covers 33.

The lobes 42 act upon thimble tappets 44 for opening the exhaust valves 39 in a well known manner. Like the intake camshafts 32, the exhaust camshafts 43 are driven at one half-crankshaft speed by a suitable cam timing drive.

The construction of the engine 11 as thus far described may be considered to be conventional and, for the reasons already noted, further discussion of its detailed construction except for the oil pump, which will be described shortly, is not believed to be necessary to permit those skilled in the art to practice the invention.

The invention deals with the oil pump, which is shown, in most detail in FIGS. 2–6 but before referring these figures, it should be noted that the oil pump draws oil from the oil pan 22 through a strainer 45 and pick up tube 46. The pick up tube 46 delivers oil to the oil pump in a manner, which will be described shortly.

Figure 6:
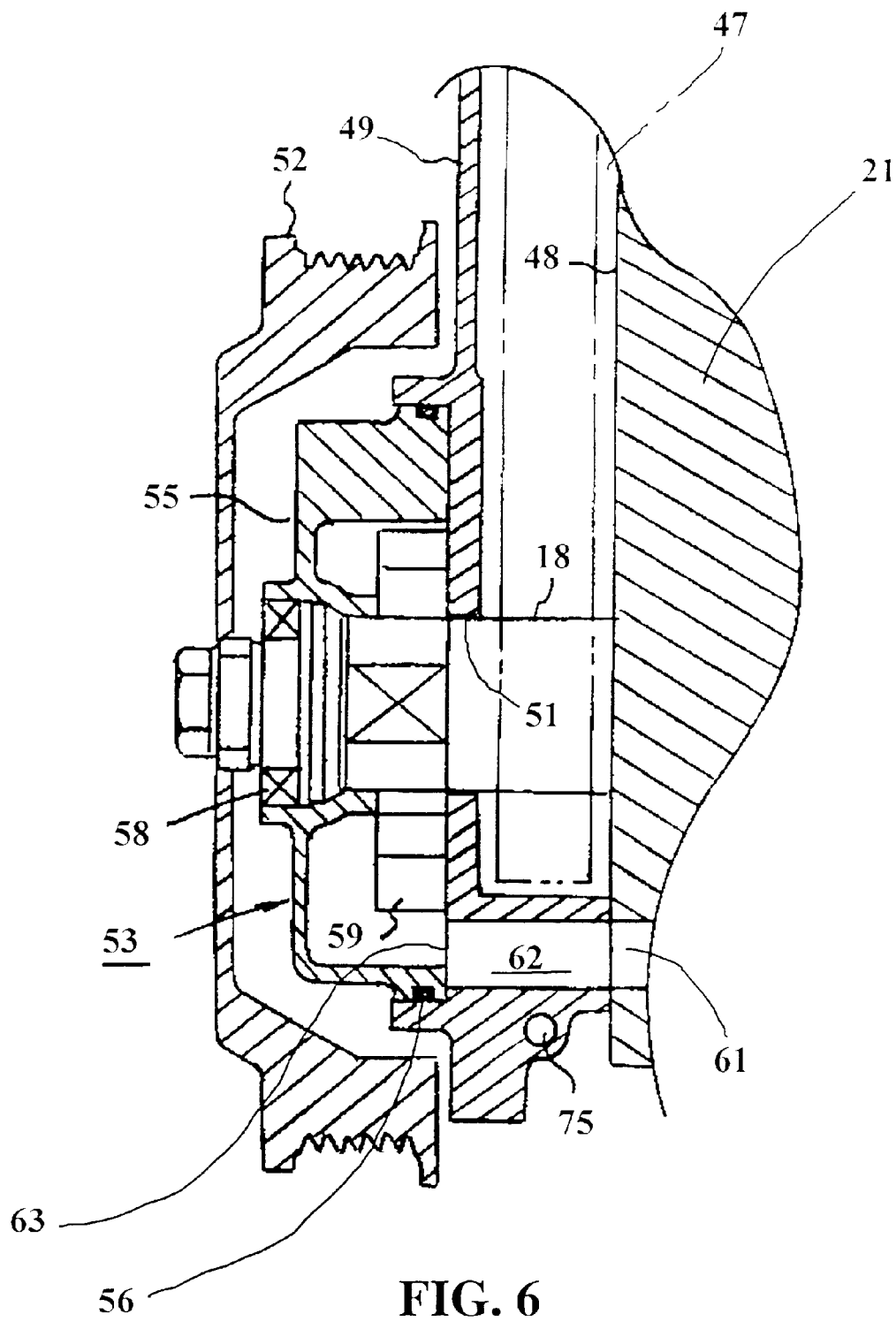
FIG. 6 is a cross sectional view taken along the line 6—6 of FIG. 3.

Referring now to FIGS. 2–6, it has been mentioned that the camshafts 32 and 43 are driven by a suitable timing drive and that drive is positioned at the front end of the engine as seen in FIG. 6 and which may include a timing chain 47 that is driven by a sprocket mounted on the crankshaft 18. This timing chain 47 is disposed outwardly of a front end wall 48 formed in the main engine body and primarily the cylinder block 12 and which is closed by a timing case cover 49 which forms the outer peripheral edge at one end of the engine body. This timing case cover 49 is affixed to the cylinder block 12 in a suitable manner and is shown in more detail in FIG. 2.

Figure 2:
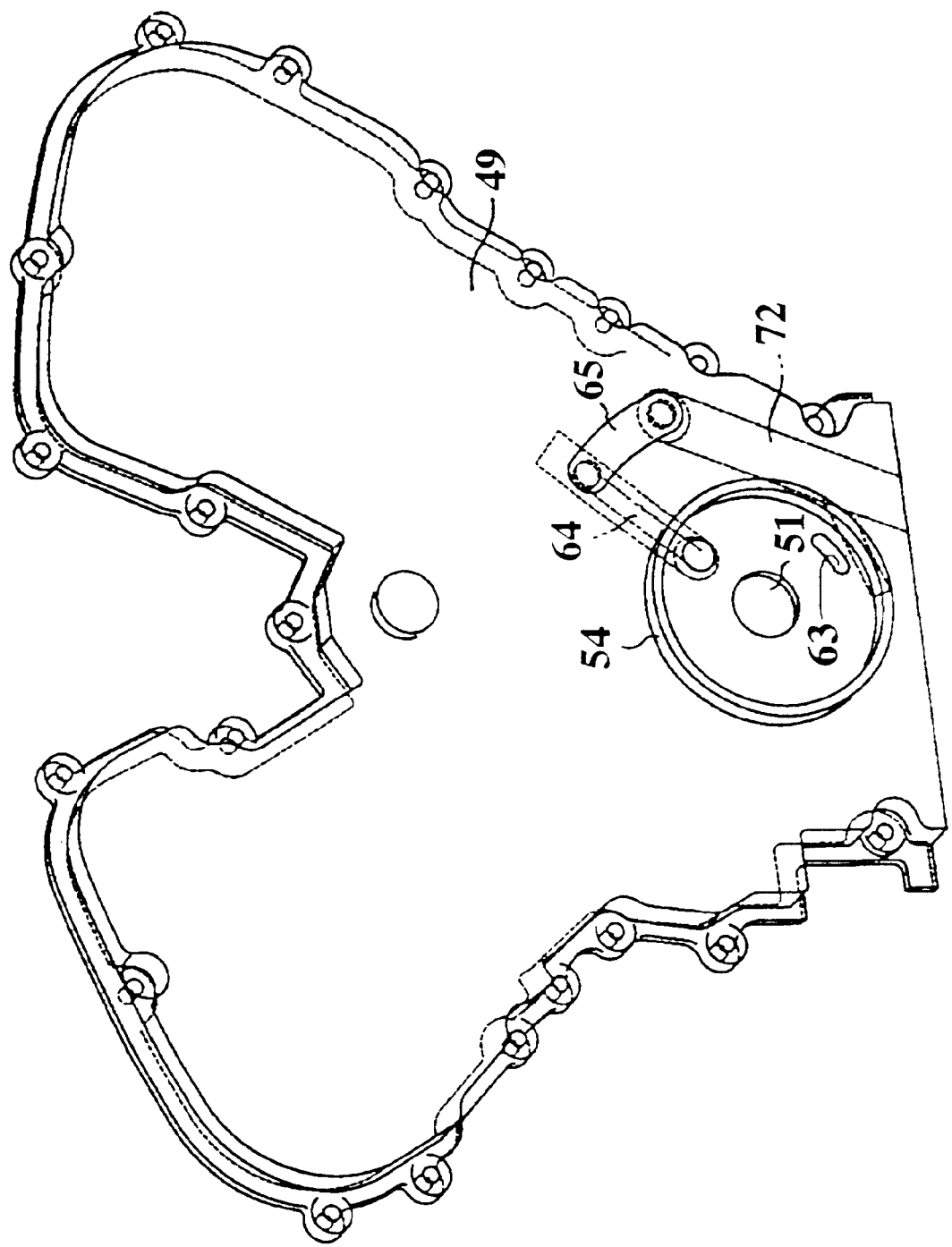
FIG. 2 is a perspective, front view of the front or timing cover of the engine.
Figure 3:
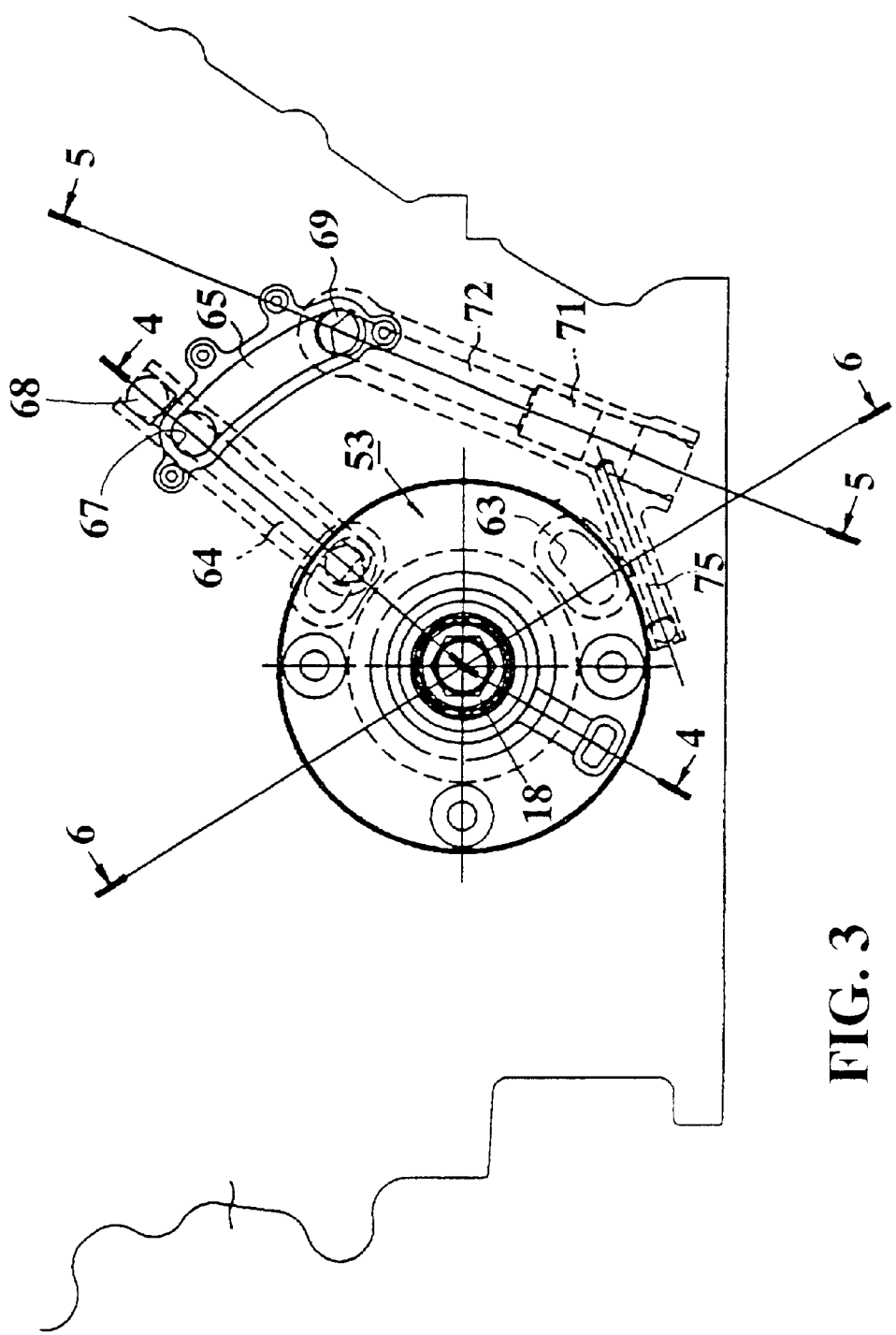
FIG. 3 is an enlarged front elevational view of the engine front cover in the area of the oil pump.
Figure 4:
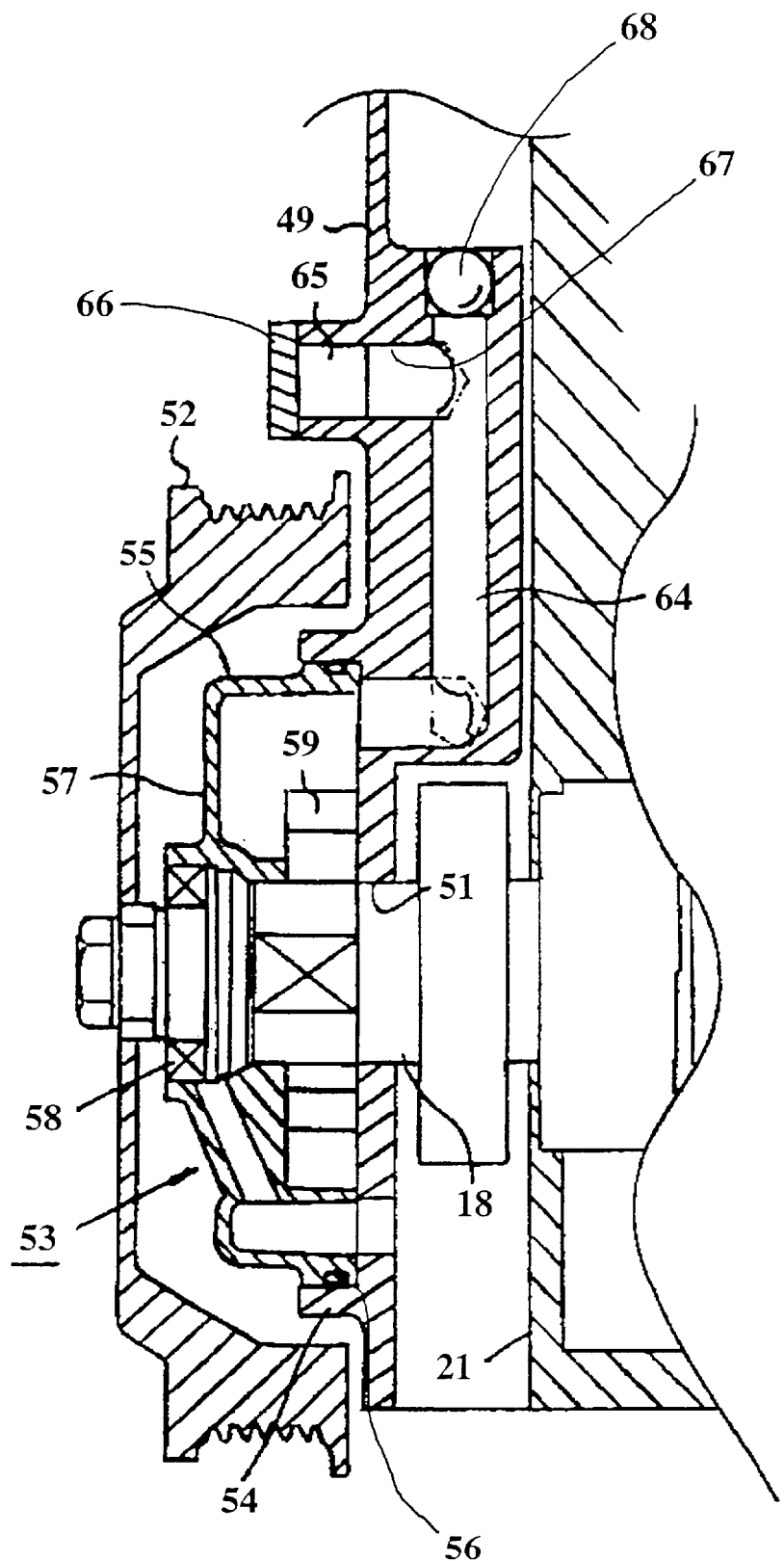
FIG. 4 is a cross sectional view taken along the line 4—4 of FIG. 3.
Figure 5:
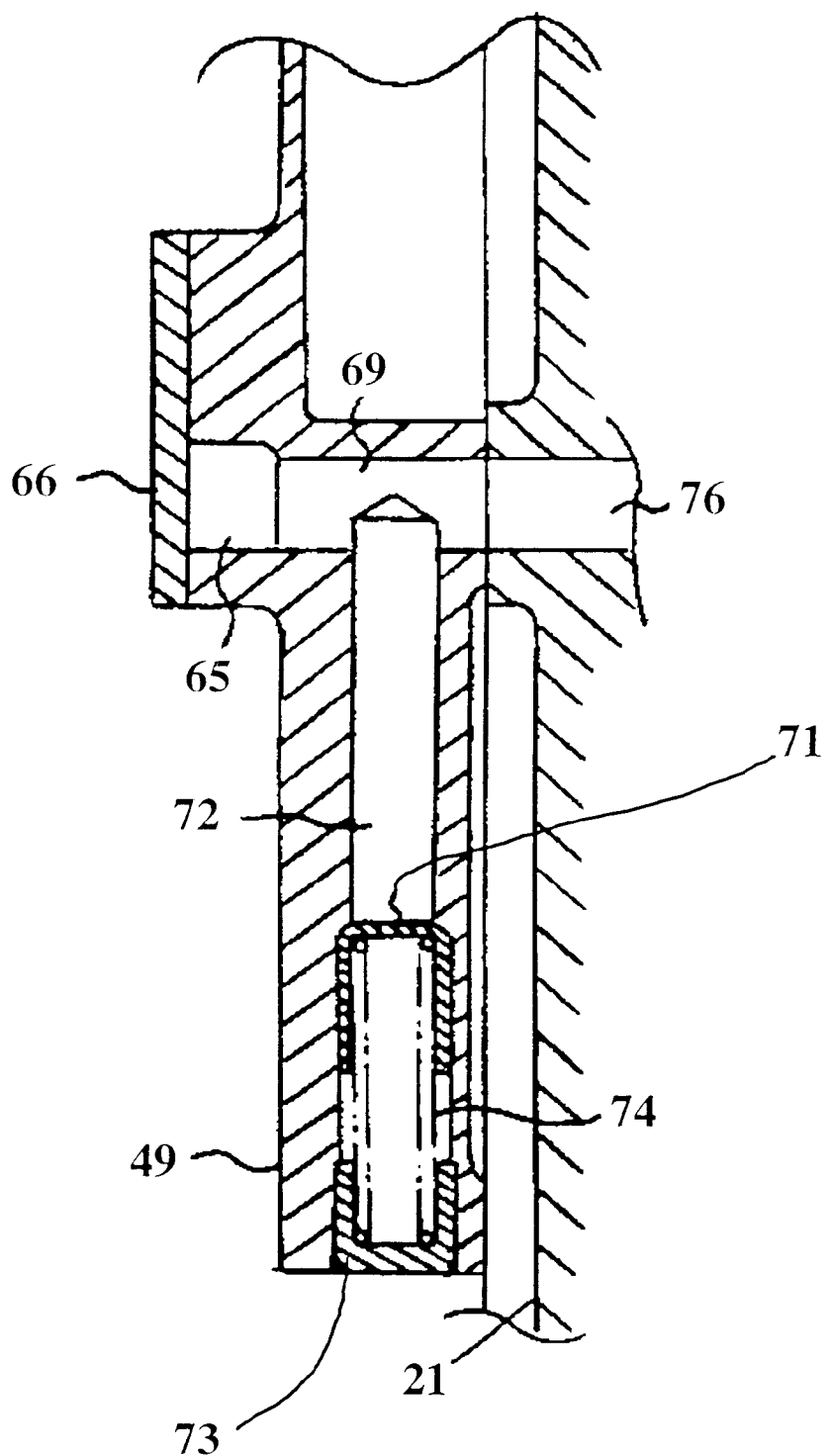
FIG. 5 is a cross sectional view taken along the line 5—5 of FIG. 3.

Referring specifically to FIGS. 2, 4 and 6, the timing case cover 49 is provided with an opening 51 through which one end of the crankshaft 18 extends. A pulley 52 is affixed to this extending crankshaft end portion for driving one or more engine accessories and other pulleys. This is conventional practice. However, and in accordance in accordance with the invention, an oil pump assembly, indicated generally by the reference numeral 53, is positioned within the hollow interior of the drive pulley 52 and on the outer front face of the timing cover 49 or front end wall of the engine 11.

The oil pump assembly 53 is formed in part by a circumferentially extending flange 54 of the timing cover 49 which flange receives a pump cover 55. An O-ring seal 56 is provided around the flange 54 for providing an oil tight seal in this area. The pump cover 55 has an end wall 57, which receives a seal 58 around the crankshaft end and inwardly from the point where the pulley 52 is affixed.

The oil pump 53 is of the trochoidal type, although other types can be utilized, and has a driving member 59. This driving member 59 is suitably coupled to the portion of the end of the crankshaft 18 that extends into the pump cover 55 and cooperates with the pump cover 55 to draw oil from the tube 46 through a passageway 61 formed in the cylinder block 12 and a corresponding passageway 62 (FIG. 6) formed in the timing cover 49. This oil then enters the oil pump 53 through an opening 63 formed in the timing cover 49 radially outwardly of the opening 51 that passes the crankshaft 18.

The oil pumped by the oil pump 53 is then delivered through a supply passageway 64 (FIGS. 3–5) formed in the timing cover 49 and from there to an arcuate passageway 65 that is also formed in the rear side of the timing cover 49. The outer side of this passageway 65 is closed by a closure plate 66 that is affixed in a suitable manner to the timing cover 49 in overlying relationship to the passageway 65. The passageway 65 is intersected by a drilled passageway 67 which is, in turn, communicates with the supply passageway 64 of the timing cover 49. The outer end of the supply passageway 64 is closed by a sealing ball 68.

The passageway 65 delivers the pumped lubricant to a further drilled passageway 69 formed in the timing cover 49 which communicates with a pressure relief valve 71 that is slidably supported in a drilled passageway 72 also formed in the timing cover 49. The outer end of this passageway 72 is closed by a closure member 73. A coil compression spring 74 normally urges the relief valve 71 to a closed position wherein communication with a small bypass port 75 is precluded. The bypass port 75 is also formed in the timing cover 49. This bypass port 75 communicates back with the inlet side of the pump 53 or with the oil pan 22, depending upon the preference of the designer.

The passageway 69 also communicates with a main oil gallery 76 that is formed in the cylinder block 12 and which serves to distribute lubricant to the engine 11 for its lubrication in any well known manner.

Thus, from the foregoing description, it should be readily apparent that the oil pump 53 is positioned externally of the main engine body and specifically the cylinder block 12 and oil pan 22 and thus, permits shortening of the internal portion of the engine. Because the oil pump 53 is nested within the drive pulley 52 it also does not add to the overall length of the engine. Furthermore, a simpler construction is possible and thus the engine can be made more compact and yet the lubrication system very easily manufactured. Of course, the foregoing description is that of a preferred embodiment of the invention and various changes and modifications may be made without department from the spirit and scope of the invention, as defined by the appended claims.

What is claimed is:

1. An internal combustion engine comprising an engine body defining at least one combustion chamber in which a piston reciprocates, a shaft driven by the reciprocation of said piston, said shaft having an end portion extending beyond a generally planar outer surface of an outer wall of said engine body encircling said shaft end portion, a pulley affixed to said shaft end portion for driving an engine accessory, an oil pump housing separate from said outer wall affixed to said outer wall surface in surrounding relation to said shaft end portion, said oil pump housing defining a pumping cavity containing a pumping element driven by said shaft end portion and closed by said outer wall surface for pumping a lubricant for said engine.

2. An internal combustion engine as set forth in claim 1 wherein the oil pump housing is disposed at least in part in overlapping relationship to the pulley in the direction of the shaft axis.

3. An internal combustion engine as set forth in claim 2 wherein the pulley is disposed in circumferential surrounding relationship to the oil pump housing.

4. An internal combustion engine as set forth in claim 1 wherein the engine shaft drives an internal engine accessory via a driving member formed on the other side of the outer wall of the engine body.

5. An internal combustion engine as set forth in claim 4 wherein the internal engine accessory comprises a camshaft.

6. An internal combustion engine as set forth in claim 5 wherein the outer wall comprises a timing chain case affixed to a cylinder block which cylinder block journals the engine shaft.

7. An internal combustion engine as set forth in claim 6 further including a relief valve formed internally in the front cover for controlling the pressure of the lubricant supplied to the engine by the oil pump.

8. An internal combustion engine as set forth in claim 7 wherein the front cover is formed with a circumferential flange surrounding said outer wall planar surface and the oil pump housing is nested within said cylindrical flange.

9. An internal combustion engine as set forth in claim 8 wherein the oil pump housing is disposed at least in part in overlapping relationship to the pulley in the direction of the shaft axis.

10. An internal combustion engine as set forth in claim 9 wherein the pulley is disposed in circumferential surrounding relationship to the oil pump housing.

11. An internal combustion engine as set forth in claim 10 further including a relief valve formed internally in the engine body outer wall for controlling the pressure of the lubricant supplied to the engine by the oil pump.

12. An internal combustion engine as set forth in claim 1 wherein the outer wall planar surface defines an oil inlet to the pumping cavity and a pressurized oil outlet from said pumping cavity.

* * * * *